United States Patent
Di Dio et al.

(10) Patent No.: US 6,821,463 B2
(45) Date of Patent: Nov. 23, 2004

(54) METHOD AND MOLD CLAMPING PRESS FOR INJECTION MOLDING MACHINES

(75) Inventors: Leonardo Di Dio, Turin (IT); Anselmo Vignale, Chieri (IT)

(73) Assignee: Sandretto Industrie S.p.A., Collegno (IT)

( * ) Notice: Subject to any disclaimer, the term of this patent is extended or adjusted under 35 U.S.C. 154(b) by 254 days.

(21) Appl. No.: 10/190,603

(22) Filed: Jul. 9, 2002

(65) Prior Publication Data

US 2003/0020194 A1 Jan. 30, 2003

(30) Foreign Application Priority Data

Jul. 19, 2001 (IT) ..................................... MI2001A1538

(51) Int. Cl.[7] .............................................. B29C 45/66
(52) U.S. Cl. .................. 264/40.5; 264/328.1; 425/150; 425/589; 425/595; 425/451.7; 425/451.9
(58) Field of Search ........................... 264/40.5, 328.1; 425/149, 150, 589, 595, 450.1, 451.3, 451.7, 451.9

(56) References Cited

U.S. PATENT DOCUMENTS

| | | |
|---|---|---|
| 2,916,768 A | 12/1959 | Quere et al. |
| 3,604,058 A | 9/1971 | Fischbach et al. |
| 5,066,217 A | 11/1991 | Fukuzawa et al. |
| 5,135,385 A | 8/1992 | Fukuzawa et al. |
| 5,188,850 A | 2/1993 | Hirata et al. |
| 5,192,557 A | 3/1993 | Hirata et al. |
| 5,417,913 A | 5/1995 | Arend |
| 6,179,607 B1 * | 1/2001 | Inaba et al. .................. 425/595 |
| 6,186,770 B1 | 2/2001 | Ziv-Av |

FOREIGN PATENT DOCUMENTS

| | | |
|---|---|---|
| DE | 1159137 | 8/1959 |
| GB | 1128454 | 9/1968 |
| WO | WO 98/51468 | 11/1998 |

* cited by examiner

Primary Examiner—Jill L. Heitbrink
(74) Attorney, Agent, or Firm—Davidson Berquist Jackson & Gowdey, LLP (57) ABSTRACT

A method and a mold clamping press for injection molding machines; the press comprises a stationary platen and a movable platen operatively connected to control means which can be operated to relatively move the platens towards and away from each other. Slidable tie-rods, each connected to a respective control cylinder, axially extend between the platens passing through locking bushes rotatably supported by a platen of the press. Each locking bush and the corresponding tie-rod are provided with opposite intermeshing screw threads having an axial clearance; the bushes are made to rotate in synchronism and in a way correlated to the displacement of the movable platen, avoiding any frictional contact between the screw threads during the closing and opening of the mold. The tie-rods are then made to slide with respect to the locking bushes and the platens of the press, causing a contact between the screw threads of the bushes and the tie-rods, and a thrust of the bushes against the movable platen, of the press to generate the required tonnage for tightly clamping the mold.

16 Claims, 12 Drawing Sheets

METHOD AND MOLD CLAMPING PRESS FOR INJECTION MOLDING MACHINES

BACKGROUND OF THE INVENTION

The present invention refers to injection molding machines for plastic materials, and in particular relates to a method and to a mold clamping press according to which use is made of a clamping device for clamping a mold, by which it is possible to operate with precision and at high speed.

STATE OF THE ART

In the plastic material injection molding, use is substantially made of two types of clamping presses for the closure of a mold, that is to say clamping presses having two platens, and presses having three platens provided with two or more peripheral tie-rods which extend longitudinally to the press.

In the case of clamping presses having three platens, these comprise a first stationary platen for supporting a half mold, a second movable platen for supporting the other one of the half molds, sliding along guide rods, and a third stationary platen forming part of a reaction structure, to which a toggle system is connected to control the sliding of the movable platen between an open condition and a closed condition of the mold, and the clamping of the same mold.

Presses of this kind require an expensive and bulky structure, and highly complex control systems necessary to generate the high clamping forces for tightly closing the mold, with mold closing and opening times compatible with the length of the entire operative cycle of the machine.

An alternative configuration to reduce costs and overall dimensions, contemplates the use of only two platens, including a stationary platen to support a first half mold, and a movable platen to support a second half mold, which is made to slide along horizontal guides by means of hydraulical actuators or other types of control systems.

A two platen press also comprises tie-rods which extend from one platen to the other one, and engage with mechanical clamping devices operated at the end of the working stroke during which the movable platen approaches the stationary platen, before exerting the high clamping force for closing the mold, or at the time of reopening of the mold at the end of each injection cycle.

Examples of injection molding machines with two platen clamping presses, and mechanical closing and clamping systems, are found in DE 1.159.137, U.S. Pat. No. 2,916, 768, U.S. Pat. No. 5,188,850; U.S. Pat. No. 5,192,557 and in WO 98/51468.

Usually, in clamping presses of this type the tie-rods are rigidly fastened and protrude jutting out from one of the platens, in such a way that their extremities engage with clamping jaws or other clamping devices disposed on the other platen of the press; the clamping jaws must be operated beforehand to engage the tie-rods which subsequently are drawn by means of hydraulic actuators capable of exerting the necessary clamping force or tonnage for closing the mold.

The injection molding presses of the aforementioned type, present the drawback of requiring long rest times between different mold opening and closing operations, which increases the working cycle of the press.

In particular, pauses are required for operating the clamping devices; such pauses have significant repercussions on the output of this type of machine.

In fact, considering that in presses of this kind it is possible to operate with molding cycles in the range of 10–15 seconds, or times even less, it is clear that resting times in the range of 0.5÷3 seconds can prove to be unacceptable or of such length as to greatly conditioning the output of the machine. This depends mainly upon the mechanical and structural characteristics of the clamping devices, as well as upon the use of complex safety systems which must come into operation each time the press is to be open and closed.

U.S. Pat. No. 5,066,217, U.S. Pat. No. 5,417,913 and U.S. Pat. No. 6,186,770 show other types of two platen clamping presses.

In particular, U.S. Pat. No. 5,066,217 and U.S. Pat. No. 5,417,913 show a two platen presses whose tie-rods are axially movable with respect to the platens supporting the half molds, and in which use is also made of mechanical systems for locking the platens to the tie-rods, which substantially comprise radially movable half nuts, or angularly rotatable coupling members which engage with corresponding screw threads or annular ribs on the tie-rods of the press. Presses of this kind again present the same drawbacks inherent in the clamping and closing devices of the patents previously referred to; in particular, they present a greater complexity of the system for locking the platens to the tie-rods and intercycle times which are still considered high for this kind of press.

U.S. Pat. No. 6,186,770, which represents the closest prior art in respect to the present invention, also shows a two platen press in which the tie-rods are axially secured to one of the platens, and in which the other platen of the press is provided with a mechanical connection with each tie-rod, substantially comprising an internally threaded bush member which engages by screwing onto a screw threaded portion of the corresponding tie-rod, both in order to cause the sliding of the movable platen, and in order to generate the tonnage necessary for the tight clamping of the mold. A belt system is provided to synchronize the rotation of all the bush members.

According to a possible embodiment, the press comprises a first control means to cause the rotation of the bushes whenever the movable platen must be moved forward or backward, and second independent control means to rotate the bushes themselves, or alternatively the same tie-rods, whenever the tonnage for clamping the mold must be exerted. In both the solutions, in addition to generation of the tonnage for clamping the mold, the threaded bushes also serve to cause the sliding displacement of the movable platen, thereby resulting in frictional forces and stress between the screw threads.

OBJECTS OF THE INVENTION

It is therefore necessary to seek new and alternative solutions whereby it is possible to obviate the aforementioned drawbacks, for closing and securing the tie-rods to the platens supporting the molds, in two platen presses for injection molding machines.

Consequently, the main object of the present invention is to provide a method and a two platen press for injection molding, which make use of a locking device for the closure and locking of the platens to the tie-bars of a press, which is capable of obviating the aforementioned drawbacks.

In particular, one object of the present invention is to provide a method for clamping a two platen press, as referred to above, allowing extremely short clamping times, suitable for fast cycle machines, and which does not require any particular or complex safety system, thereby ensuring the utmost speed and precision during the closing and tight clamping steps of a mold.

A further object of the present invention is to provide an injection molding press of two platens type, provided with a clamping system for clamping the mold and securing the platens to the tie-rods which, in addition to possessing extremely short resting times, is also extremely functionally simplified in that the locking of the platens to the tie-rods and the tight clamping of the mold, take place simultaneously and in synchronism on all the rods of the press, without causing frictional forces.

A still further object of the present invention is to provide a clamping device of the type referred to above, by which it is possible to use separate control systems for the displacement of the movable platen and for locking at the same time the platens to the tie-rods, ensuring in all cases a fast and immediate clamping action whatever the final position of the movable platen with respect to the stationary one.

BRIEF DESCRIPTION OF THE INVENTION

According to a general feature of the present invention, a method is thus provided for clamping a mold of an injection molding press of the type comprising:
  a first platen for supporting a first half mold;
  a second platen for supporting a second half mold, at least one of said platens being slidably movable with respect to the other one, parallel to a longitudinal axis of the press;
  a plurality of peripheral tie-rods parallely extending to said longitudinal axis between the two mold supporting platens of the press;
  first control means being provided for moving one platen towards and away from the other one, upon the closure and opening of the mold; and
  second control means for the tie-rods, and threaded bush members parallely arranged to the longitudinal axis of the press, said bush members having a threaded portion operatively connectable to a threaded portion of said tie-rods, to provide a high clamping force to tightly close the mold, the method comprising the steps of:
    supporting the tie-rods axially sliding with respect to both the platens of the press;
    providing a locking bush, for each tie-rod, rotatably and movably supported in the axial direction, by one of the platens of the press;
    each locking bush and the corresponding tie-rod including opposite interengaging screw threaded portions having an axial clearance between them;
    moving one of the platens in respect to the other one for closing and respectively for opening the mold by actuation of said first control means maintaining the screw threaded portions of the locking bushes and the tie-rods frictionless disengaged by synchronously rotating the locking bushes;
    interengaging the screw threaded portion of the tie-rods with the screw threaded portion of the locking bushes by causing an axial sliding movement of the bushes by said second control means, to urge a shoulder member of the bushes against a corresponding shoulder surface of the platen of the press; and
    subsequently providing a clamping force to tightly close the mold, by generating a high axial force on the tie-rods and the locking bushes.

According to a second aspect of the invention, a locking device has been provided for locking a tie-rod to a mold supporting platen of a molding press said locking device comprising:
  a displaceable tie-rod extending through the platen of the press, said tie-rod having an outer threaded portion thereon;
  a locking bush rotatably supported by the platen, said locking bush having an inner threaded portion engageable and disengageable with the outer threaded portion of the tie-rod;
  the threaded portions of the tie-rod and the locking bush being constructed and arranged to provide an axial clearance allowing a relative axial displacement between them;
  an annular shoulder on the locking bush to be urged against a shoulder surface of the platen;
  guide means rotatably engaging the locking bush to maintain the threaded portion of the same bush, disengaged from the threaded portion of the tie-rod, upon rotation of the bush and during displacement of the platen; and
  control means to provide an axial displacement between the threaded portions of tie-rod and the bush, and to urge said annular shoulder against said shoulder surface at the clamping of the mold.

According to a further aspect of the invention, a press is provided for injection molding of plastic materials, comprising:
  a stationary platen for supporting a first half mold;
  a movable platen for supporting a second half mold, said platen being slidingly movable along a longitudinal axis of the press;
  a plurality of peripheral tie-rods parallelly extending between the platens of the press, each of said tie-rods having a threaded portion at one end;
  first control means being provided to displace the movable platen towards and away from the stationary one; and
  second control means for the tie-rods and threaded bushes having threaded portions operatively engageable with threaded portions of the tie-rods to generate a clamping the force for tightly close the mold;
  the tie-rods being movably supported in the axial direction by the platens of the press, through locking bushes rotatively supported by one of the platens of the press;
  the threaded portions of each locking bush and the respective tie-rod having an axial clearance between them, to allow a relative axial movement of the tie-rod in respect to the locking bush;
  each locking bush comprising an annular shoulder to engage a shoulder surface of a platen, by a short axial movement of the same bush; and
  means for providing a synchronized rotation of the locking bushes correlated to the sliding displacement of the movable platen of the press, and to maintain the threaded portion of the bush disengaged from the threaded portion of the corresponding tie-rod;
  said second control means provided for selectively causing a first sliding movement of the tie-rods with respect to the locking bushes, along said axial clearance to bring the screw threaded portions into contact with each other, respectively a second sliding movement of the tie-rods and the locking bushes to bring the annular shoulders of the bushes into engagement with the shoulder surfaces of a platen, and to tightly clamp the two half molds.

BRIEF DESCRIPTION OF THE DRAWINGS

The general features of the present invention, and a number of particular embodiments, will be further described hereunder with reference to the accompanying drawings, in which.

DETAILED DESCRIPTION OF THE INVENTION

With reference to FIGS. from 1 to 7, a description is given hereunder of a preferred embodiment of an injection molding press with two platens, provided with a clamping device according to the present invention, and its operating method.

Figure 1:
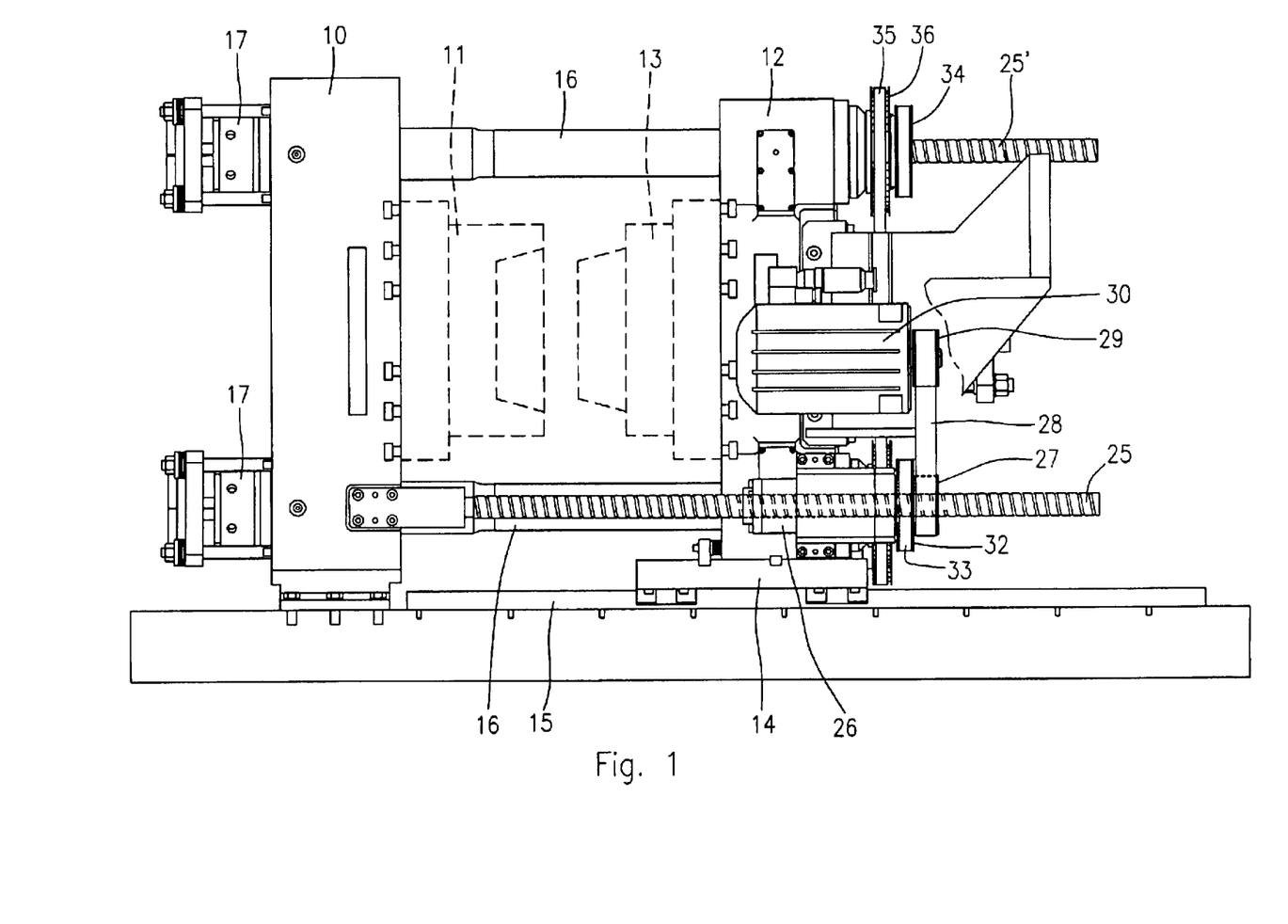
FIG. 1 shows a side view of a press according to the invention, with the platens in the open condition.

As shown in FIG. 1, a two platen press for injection molding of plastic materials, substantially comprises a first stationary platen 10 for supporting a first half mold 11, and a second movable platen 12 for supporting a second half mold 13, aligned according to the longitudinal axis of the press.

The movable platen 12 is mounted on a saddle 14 sliding along guide rails 15 parallelly arranged to the longitudinal axis of the press.

Between the stationary platen 10 and the movable platen 12 extend four tie-rods 16, peripherally disposed at the corners of the two platens 10 and 11.

Figure 4:
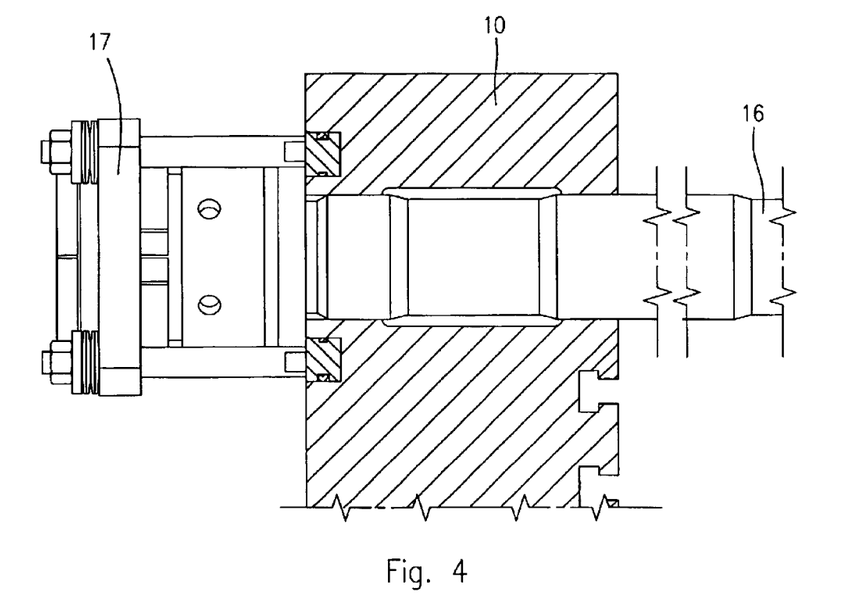
FIG. 4 shows a second enlarged detail of the clamping system, in correspondence with the other end of the tie-rod.

More precisely, as shown in the example of FIG. 4, each tie-rod 16 is slidably supported by the stationary platen 10, and is connected to any kind of actuator capable of causing the same tie-rod to shift slightly in an axial direction for a short stroke.

In particular, the actuator can be a piston cylinder unit 17, capable of generating a high force or tonnage necessary for the tightly clamping the two half molds 11 and 13.

Figure 3:
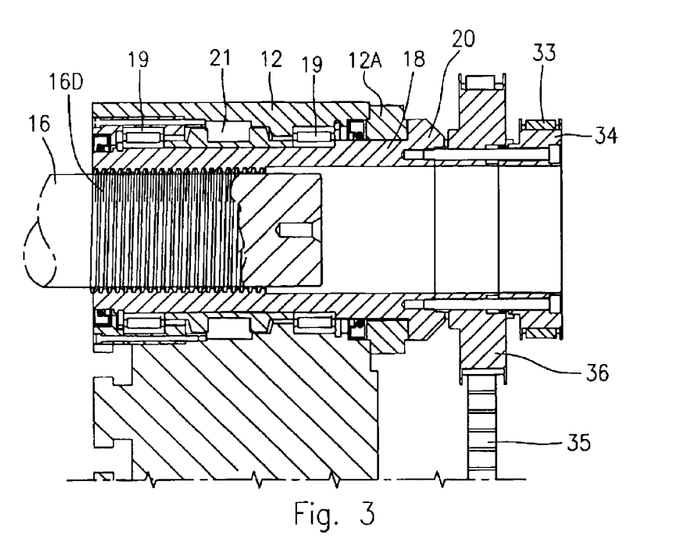
FIG. 3 shows a first enlarged detail of the clamping system, at one end of a tie-rod.

The fore end of each tie-rod, as shown in FIG. 3, presents a threaded portion 16D which extends axially through a locking bush 18; the bush 18 is supported by the movable platen 12 to freely rotate with the possibility of shifting slightly in an axial direction for the reasons explained further on, with reference to the FIGS. from 5 to 8 of the accompanying drawings.

In particular, the bush 18 is supported by the movable platen 12 by bearings 19 designed to enable the same bush to freely and frictionless rotate and to shift for a short axial clearance as specified further on.

In order to exert the thrust for the tightly clamping of the two half molds, by the axial shifting of the tie-rods 16 and the respective locking bushes 18, each bush 18, at its outer end, on the side of the movable platen opposite the one facing towards the stationary platen, is provided with an annular shoulder 20 to come against a corresponding shoulder surface of the movable platen 12, or associated part thereof, to exert through the tie-rods 16 the necessary clamping force for the closure of the mold.

Figure 5:
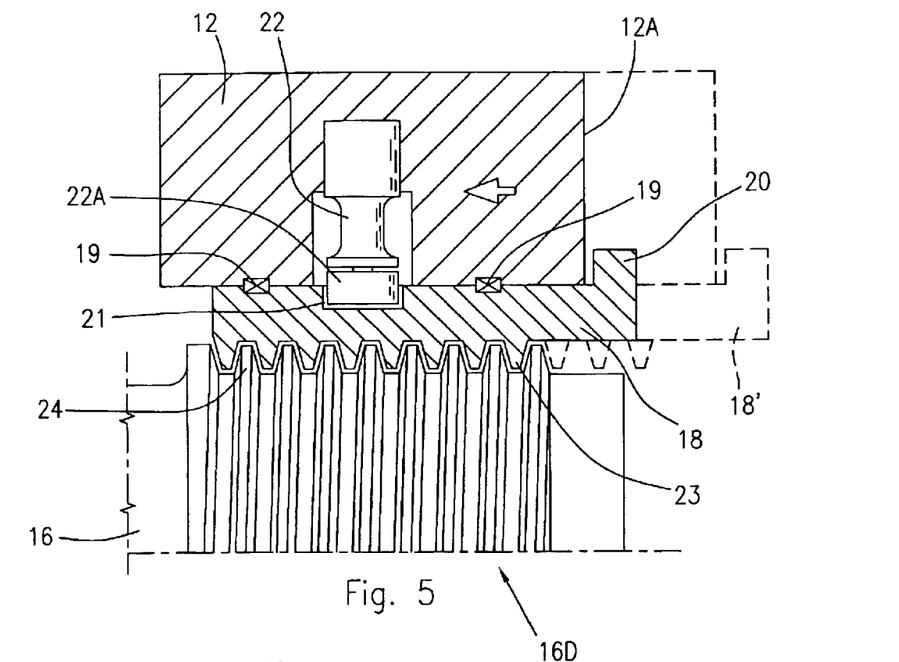
FIGS. 5, 6, 7 and 8 show, in different operative conditions, the clamping device according to the invention.

Guide means are also provided to maintain the bush 18 in a central position with the screw thread 23 constantly disengaged from the screw thread 24 of the corresponding rod 16, and to allow a relative axial movement, for the purposes specified previously; said guide means can be achieved in any way whatsoever; for example, as shown in FIGS. from 5 to 8, the bush 18 can be provided on the outer surface with an annular slot 21 in which penetrate a guide roller 22A idly supported at the end of an elastically flexible guide pin 22; the pin 22 with the guide roller 22A protrudes radially from the movable platen 12 to guide and maintain the bush 18, during rotation, appropriately centred with respect to the threaded portion 16D of the rod 16. Thus the bush 18 is able to rotate freely without frictional forces and without contact with the internal screw thread 23 of the bush and the corresponding external screw thread 24 of the rod 16, as shown in FIG. 5 of the accompanying drawings.

In this connection, as can be seen in the various FIGS. from 5 to 8, between the screw thread 23 inside the bush 18 and the screw thread 24 outside the portion 16D of each tie-rod 16, there is a slight axial clearance sufficient to allow a relative axial movement between the rod 16 and the bush 18, for the purposes specified further on.

Moreover, as shown in the cross-sectional views, the two screw threads present trapezoidal threads with similarly slanted sides, to transfer to the bush 18 and from the latter to the movable platen 12, all the forces exerted on the tie-rods 16, without subjecting the same screw threads on excessive stress.

According to a further aspect of the invention, the press is provided with control means for controlling the movable platen, operated independently of the control means for the tie-rods; said control means consists of hydraulic cylinders 17 which act to shift the movable platen 12 towards and away from the stationary platen 10, respectively upon the closing and opening of the mold, and suitable means for controlling the synchronized rotation of all the locking bushes 18, in a way correlated to the sliding displacement of the movable platen 12.

Figure 2:
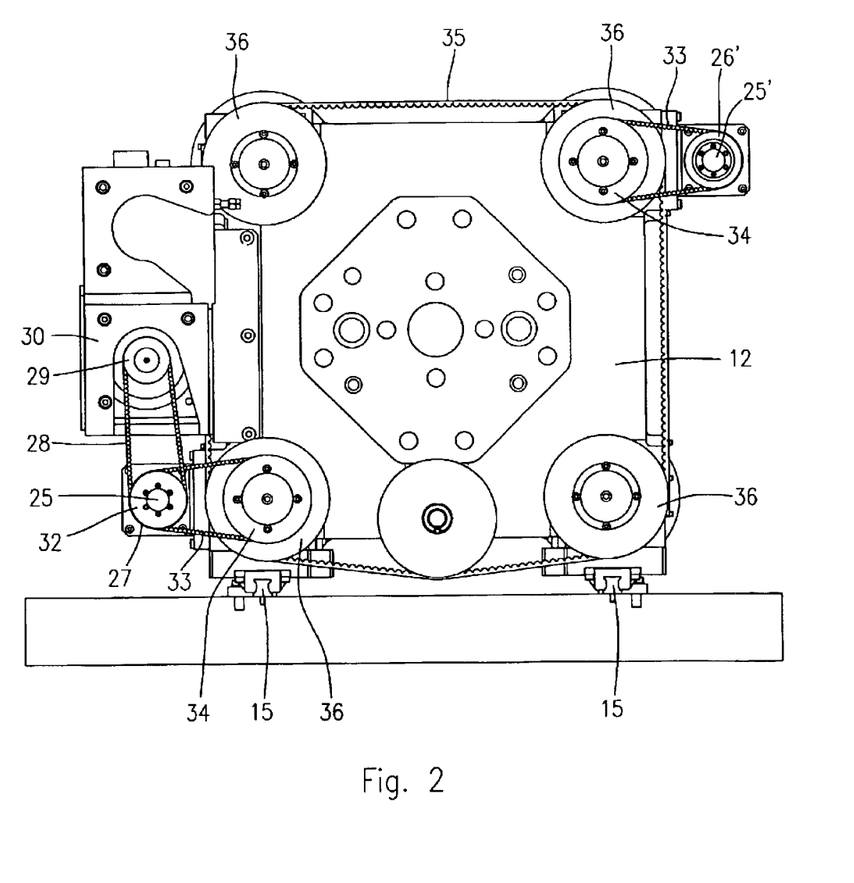
FIG. 2 shows a view from the right-hand of the press of FIG. 1.

In particular, in the solution shown in FIGS. 1 and 2, the means for controlling the movement of the movable platen 12 comprise, on each side of the press, a ball bearing screw 25, 25' connected to the stationary platen 10, which engages with a screw nut 26, 26' rotatingly supported on one side of the movable platen 12.

One of the two screw nuts, for example the screw nut 26 is in turn provided with a pulley 27 connected, by means of a belt 28, to the pulley 29 of an electric control motor 30.

The screw nut 26 is in turn connected, by means of a second pulley 32 and a belt 33, to a pulley 34 coaxially arranged to the locking bush 18 of one of the tie-rods 16 in the lower left-hand corner of FIG. 2.

The bushes 18 for locking the movable platen 12 to the tie-rods 16, are in turn controlled to rotate in synchronism, for example by means of a positive drive belt 35 which winds around corresponding pulleys 36 coaxially arranged to the bushes 18, as shown in FIG. 2 and in the enlarged detail of FIG. 3.

For the displacement of the movable platen 12 it is possible to use a single screw/nut system 25', 26; however, in certain cases it is preferable to make use of a double screw/nut system as shown in FIGS. 1 and 2.

The operation of the device for securing the platens to the rods 16 and clamping the mold according to the present invention, will be now described hereunder with reference both to FIGS. 1 to 4 of the accompanying drawings, and to the diagrams in FIGS. from 5 to 8, which show the main steps of engagement and/or disengagement between the threaded portion 16D of each tie-rod 16, and the respective locking bush 18.

Assuming that the press is initially in the open condition shown in FIG. 1, and that the individual bushes 18 are in turn in the retracted position with respect to the threaded portion 16D of the tie-rods 16, as schematically represented in 18' by the broken lines in FIG. 5.

In this condition, the screw threads 23 of the bushes 18 are not in contact with the screw threads 24 of the tie-rods; consequently, the bushes 18 can be made to rotate freely without any contact and without frictional forces between the screw threads 23, 24 due to the presence of the guide pin 22 for centring and guiding the bushes.

Due to the use of a synchronization system between the axial movement of the platen 12 and the rotation of the bushes 18, the latter are able to rotate freely without any contact between the screw threads, throughout the entire forward stroke of the movable platen 12, as though the bushes 18 were screwing along an ideal thread.

During the forward sliding of the movable platen 12, the two half molds 11 and 13 approach each other until their respective frontal surfaces come into contact; during this movement, the synchronizing system 34, 35, 36 maintains the disengaged condition of the screw threads 23 of the bushes 18 from the screw threads 24 of the individual rods 16, as shown by the continuous line in FIG. 5; this condition is ensured by the guide pins 22 of the individual bushes 18.

At this point it is possible to carry out the engagement of the screw threads 24 of the rods 16 with the screw threads 23 of the bushes 18, by means of a first short axial movement of the same rods 16, in the displacement direction of the movable platen 12, by a control imparted to the hydraulic cylinders 17.

Figure 6:
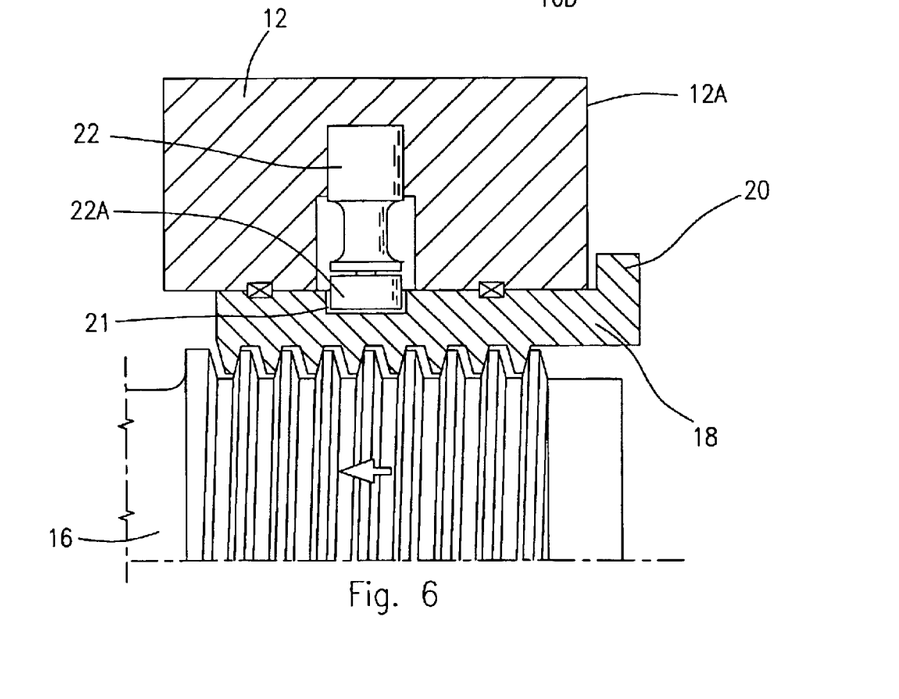

This condition is shown in FIG. 6 in which it can be seen that the left sides of the screw threads 24 have come into contact with the right sides of the screw threads 23.

Figure 7:
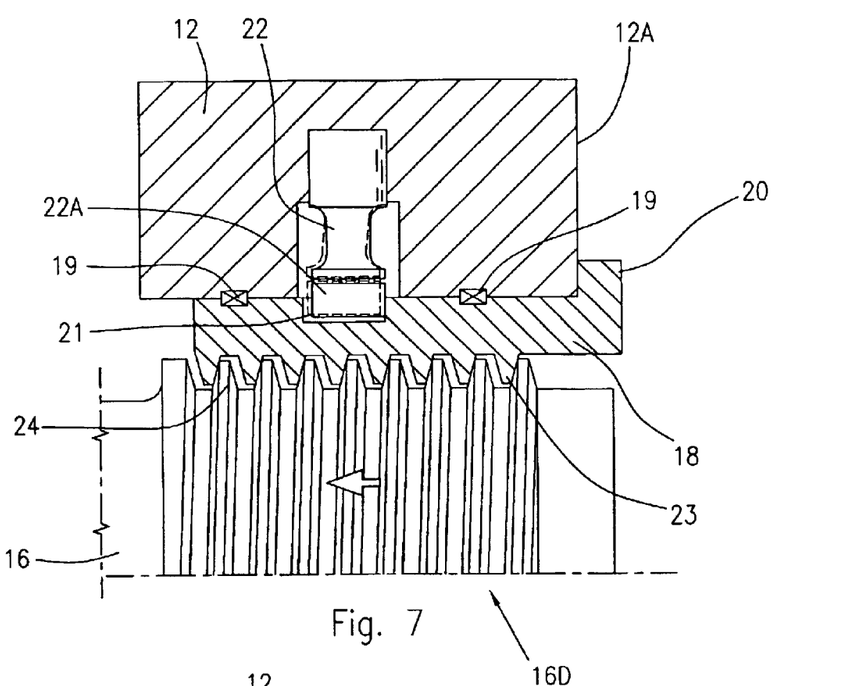

After this first axial movement of the rods 16, designed to bring the screw threads 23 and 24 into contact each other, continuing the action of the control cylinders 17 gives rise to a second short axial movement of the rods 16 in order to bring the annular shoulders 20 of each bush 18 into contact with a corresponding shoulder surface 12A of the movable platen 12; this condition is shown in FIG. 7 of the drawings.

By continuing the feeding of the pressurized fluid to the cylinders 17, it is possible to exert a drawing action on the rods 16, to generate a strong thrust to tightly clamp the two half molds 11 and 13 together.

In this condition, the guide pin 22 is slightly elastically bent by the thrust exerted by a side of the slot 21 on the roller 22A.

Upon completion of an injection step and consolidation of plastic material in the mold, it is possible to open the latter by reversing the procedure previously described.

Figure 8:
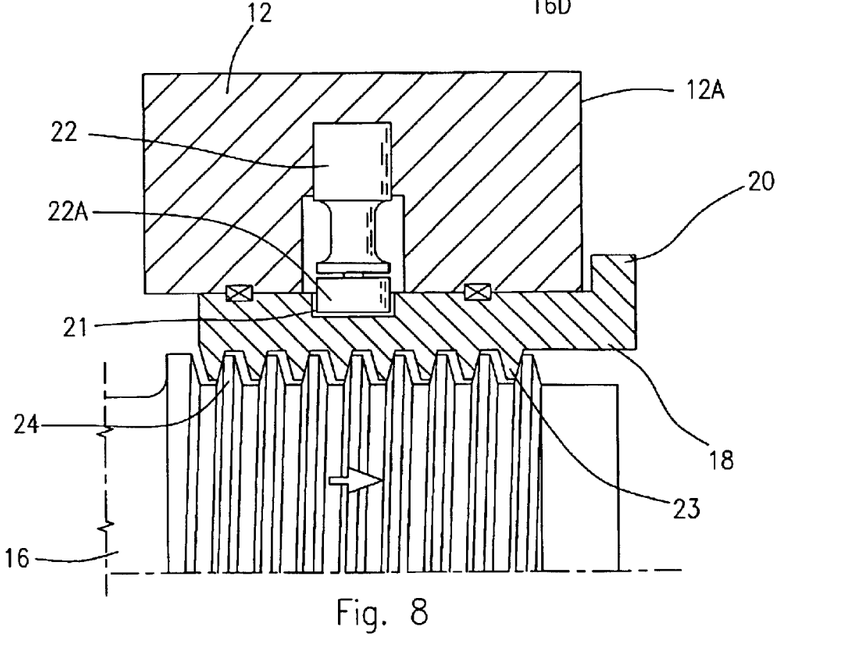

That is to say, the pressure in the cylinders 17 is released, thereby nullifying the drawing action on the rods 16; consequently, due to the opposite thrust now exerted on the rods 16 by the cylinders 17, the bushes 18 will be made to move back until the shoulders 20 are disengaged from the surfaces 12A of the movable platen 12, maintaining the contact condition between the screw threads 23 and 24 by the biasing action exerted by the pin 22 on the bush 18, which returns to its initial position; this condition is shown in FIG. 8 of the accompanying drawings.

Lastly, by means of the hydraulic cylinders 17, the rods 16 are once again made to slightly move back to allow the screw thread 24 of each rods 16 to disengage from the screw thread 23 of the corresponding locking bush 18, thereby restoring the condition shown in FIG. 5.

In this condition, the movable platen 12 can now be made to move backward again, by reversing the motor 30 of the screw nut/ball screw system 25 and 26, making the bushes 18 once again rotate in synchronism to maintain their screw threads disengaged from those of the rods 16 throughout the entire opening stroke of the press.

In the case shown in the FIGS. from 1 to 8, the pin 22 performs the dual function of a guiding and centring the threaded bush 18, and of a biasing means to return and maintain the bush in a disengaged condition of the screw threads; these guiding and centring functions of the threaded bush 18 may be obtained by different means either of the passive type, or of the active type in substitution of the flexible pins 22.

For example, the pins 22 may be replaced by two packs of Belleville washers acting on the two ends of each threaded bush 18, or by positively controlling the movement of the bush in one or both directions, by means of an appropriate hydraulic, pneumatic, electromagnetic or other type of actuator or control system.

From the foregoing, it is clear that the most highly innovative feature of the press and its operative method primarily consists in the use of tie-rods which are movable with respect to both the mold platens, and in the use of locking bushes rotatingly and axially movably supported by one of the platens of the press, and in which the bushes present an internal screw thread which is maintained constantly disengaged and not in contact with a corresponding screw thread at one extremity of the tie-rods, while the same bushes are made to rotate in synchronism during the sliding displacement of the movable platen of the press, and in a way correlated to the forward and backward movement of the same platen.

In this way the screw threads of the bushes and of the rods can be quickly engaged and disengaged with one another for securing and respectively releasing the movable platen with respect to the tie-rods of the press, thereby enabling the almost immediate clamping and opening of the molds.

In the case of FIG. 1, the locking bushes 18 and the synchronizing system have been disposed on the movable platen 12 of the press, while the hydraulic cylinders 17 for drawing of the tie-rods 16 have been disposed on the stationary platen 10; however, their disposition may also be reversed as compared to that shown, without prejudice to the general features of the present invention.

In the example shown in FIGS. 1 and 2 use has also been made of a first control means for controlling the movable platen, consisting of a screw/nut system 25, 26 operated by an electric motor 30, and a second control means consisting of the hydraulic cylinders 17 to axially move the rods 16 and secure them to the platens 10 and 12 to exert the necessary force ensuring the clamping and tight closing of the two half molds 11 and 13.

Moreover, in the example shown in FIGS. 1 and 2, the system for synchronizing the rotation of the locking bushes 18 and the sliding movement of the movable platen 12, makes use of the screw nut system 25, 26 directly as a means of transducing the sliding movement of the movable platen and of correlation with the rotation of the bushes 18.

It is understood however that within the scope of the present invention other solutions are possible, in particular with regard to the use and type of the control means and of the system for synchronizing the rotation of the locking bushes, and for coordination with the sliding of the movable platen.

Several of the numerous possible solutions are shown in the examples of the remaining figures in which the same reference numbers of the previous figures have been used to indicate similar or equivalent parts.

Figure 9:
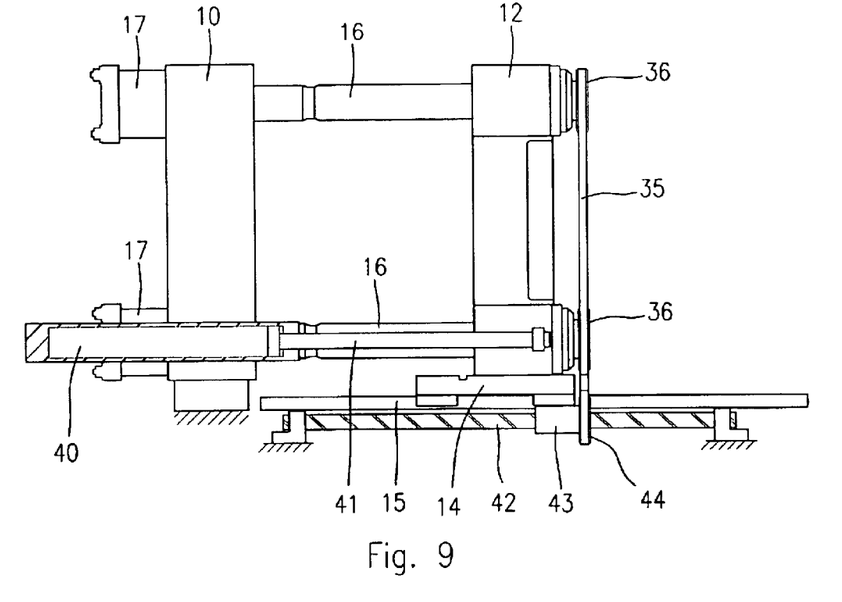
FIG. 9 schematically shows a second embodiment.
Figure 10:
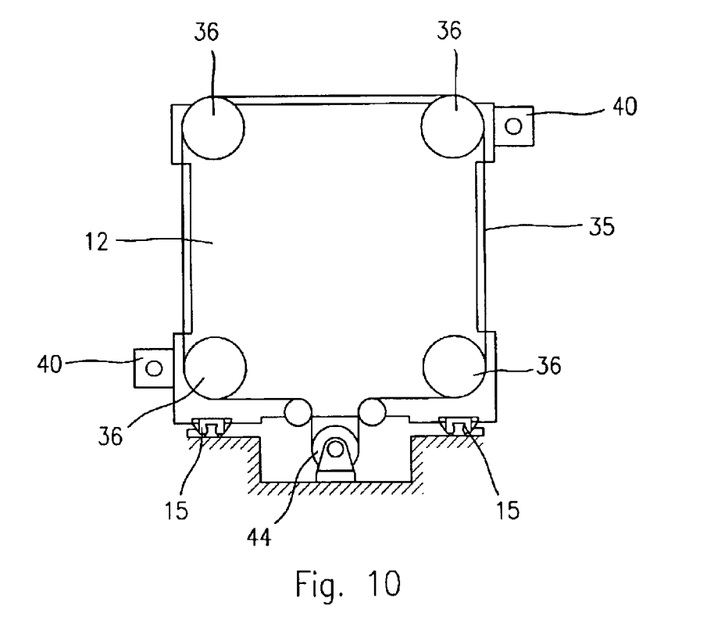
FIG. 10 shows a view from the right-hand of FIG. 9.

A second solution is shown in FIGS. 9 and 10 in which the screw/nut system 25, 26 of the previous example has been replaced by at least one hydraulic cylinder 40, two in the case shown, fastened to the stationary platen 10, while its rod 41 is connected to the movable platen 12.

In this case, the synchronization between the rotation of the various bushes 18 for locking the platen 12 to the rods 16, and the sliding movement of the movable platen are always obtained by means of a mechanical movement transducer comprising a fixed ball-type screw 42 and a nut screw 43 rotatingly supported on one side of the movable platen 12, centrally disposed beneath the press; a pulley 44 rotates with the nut screw 42 to control the driving belt 35 which winds around the pulley 36 to synchronize the rotation of the various bushes 18 locking the platen 12 to the rods 16 of the press.

For the remainder, the press of FIGS. 9 and 10 operates in a wholly identical manner to the press of the preceding example.

Figure 11:
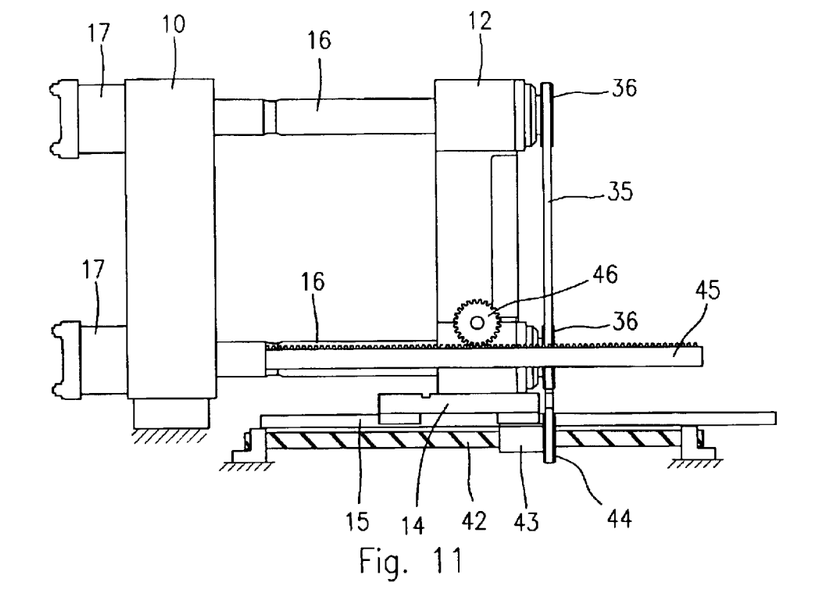
FIG. 11 shows a third embodiment.
Figure 12:
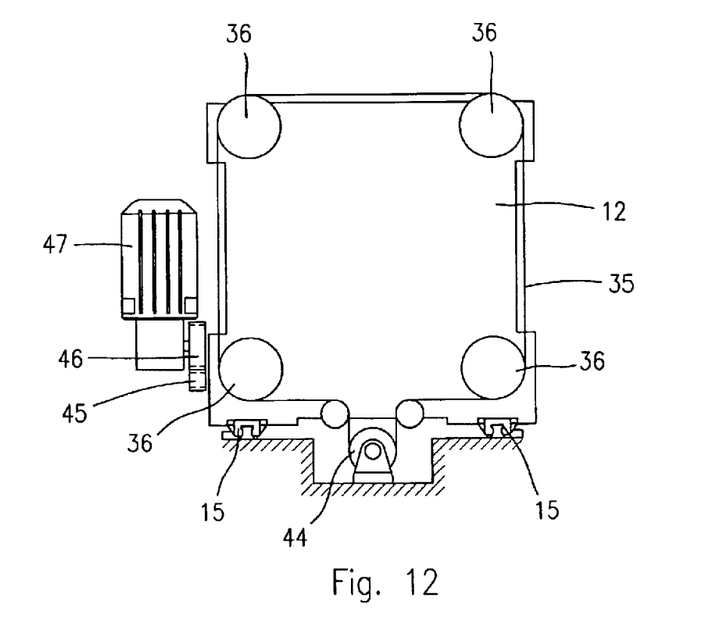
FIG. 12 shows a view from the right-hand of FIG. 11.

FIGS. 11 and 12 show a third embodiment, substantially similar to that of FIGS. 9 and 10, the only difference being that now the hydraulic cylinder 40 which controls the sliding of the movable platen 12, has been replaced by a rack type control device comprising a rack 45 on one side of the press, fastened to the stationary platen 10, and a gear wheel 46 connected to an electric motor 47 supported by the movable platen 12. Consequently, in FIGS. 11 and 12 the same reference numbers as in FIGS. 9 and 10 have been used to indicate similar or equivalent parts.

Figure 13:
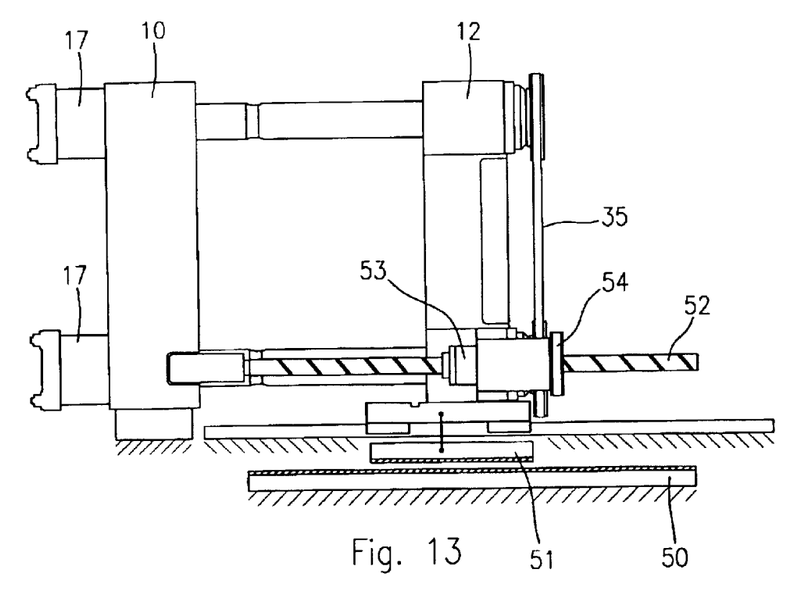
FIG. 13 shows a fourth embodiment.
Figure 14:
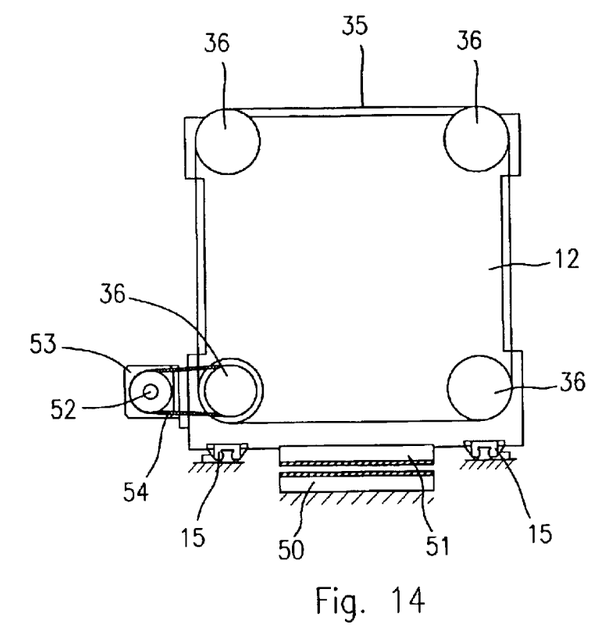
FIG. 14 shows a view from the right-hand of FIG. 13.

FIGS. 13 and 14 show a fourth possible solution which differs from the preceding ones in that the means for controlling the sliding of the movable platen 12, in this case consists of a linear electric motor, centrally disposed beneath the platens of the press, comprising a stationary member 50 and a movable member 51 connected to the movable platen 12, as schematically shown.

Control of the synchronized rotation of the various locking bushes 18 on the rods 16, is also achieved by means of a belt drive 35, 36, and is derived from the linear movement of the movable platen 12 by means of a screw/nut system 52, 53, in which the rotation of the screw nut 53 is transmitted to the locking bush of at least one of the drawing rods, by means of a belt drive 54, as shown, or in any other suitable way.

Consequently, also in FIGS. 13 and 14 a part of the same reference numbers as the previous figures have been used to indicate similar or equivalent parts.

Figure 15:
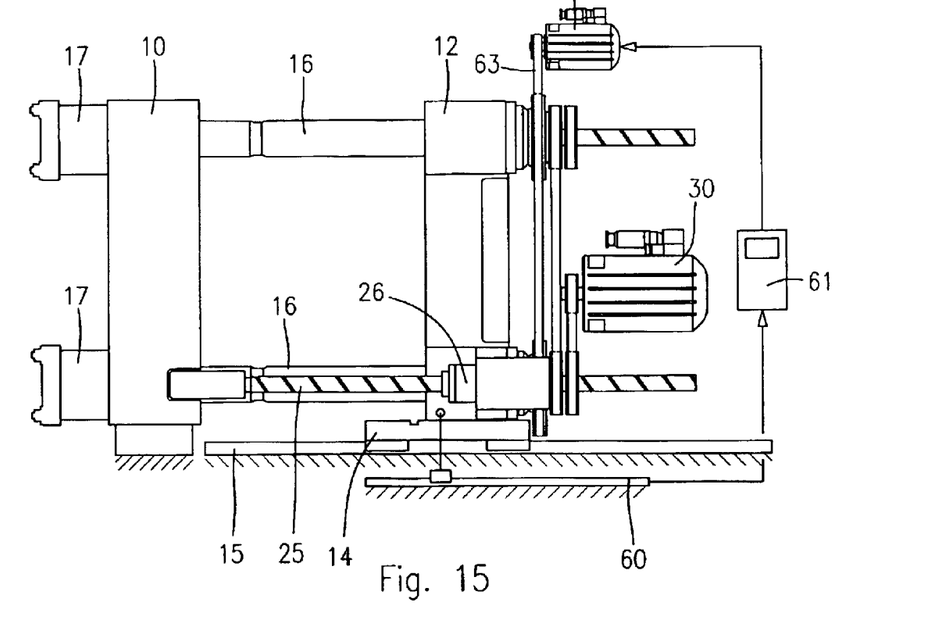
FIG. 15 shows a fifth embodiment.
Figure 16:
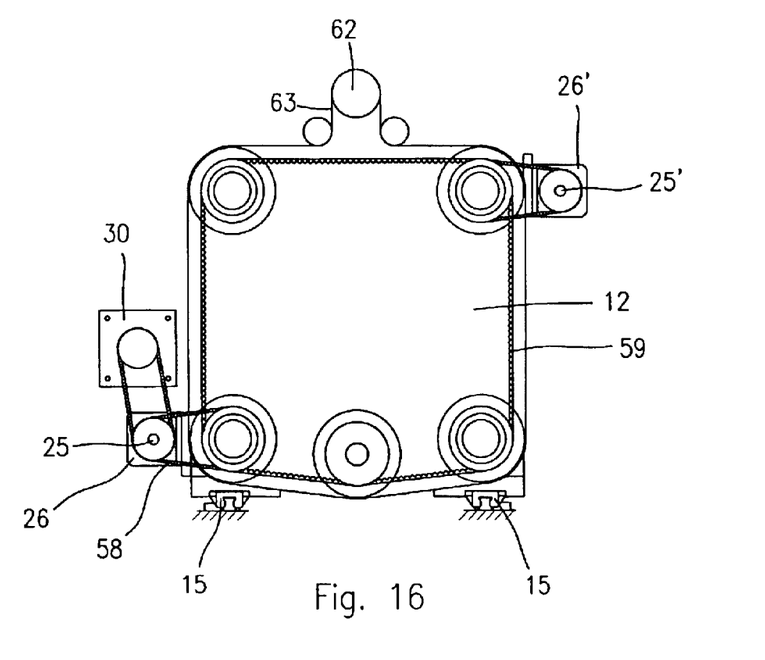
FIG. 16 shows a view from the right-hand of FIG. 15.

FIGS. 15 and 16 show a fifth solution which differs from the preceding solutions in that use is made of an electronic interlocking system for synchronizing the rotation of the locking bushes 18, with one another and in a way correlated to the sliding movement of the movable platen 12.

The control of the movable platen 12 is again achieved by means of a screw/nut system 25, 26 and 25', 26' operated by a motor 30 in a way similar to the solution of FIG. 1; in this case, the control to the second nut screw 26' is transmitted by means of a first mechanical belt drive 58, 59, while the synchronization between the movement of the platen 12 and the rotation of the bushes 18, is achieved by means of an electric or electronic transducer comprising, for example, a linear movement or positional transducer 60 operatively connected to the movable platen 12 of the press; the output signal of the transducer 60 is transmitted to a port of an electronic control unit 61 which governs the running of an electric motor 62 which, by means of a second belt drive 63, or in any other way, drives the synchronized rotation of the various locking bushes 18 on the rods 16 of the press.

In these figures, the reference numbers of the previous figures have once again been used to indicate similar or equivalent parts.

Figure 17:
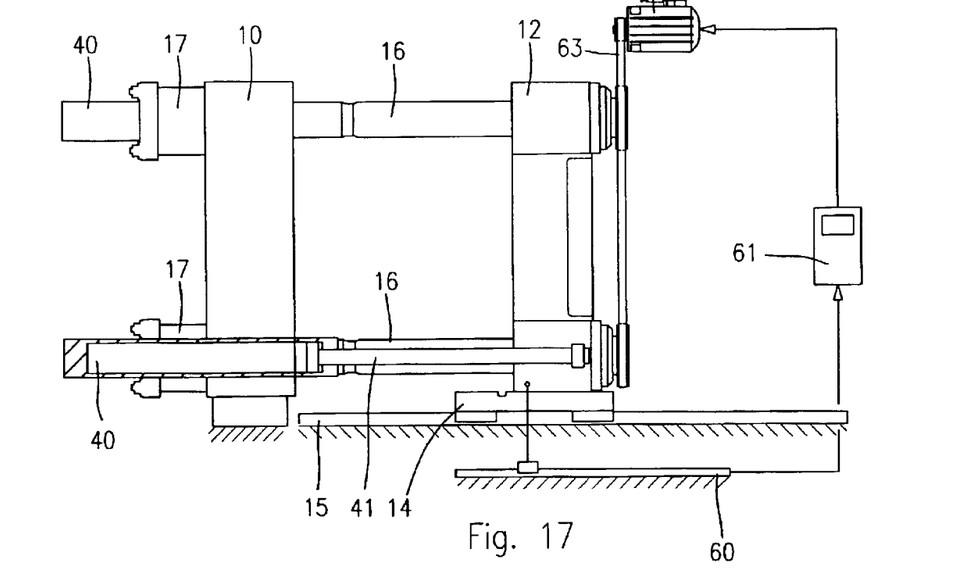
FIG. 17 shows a sixth embodiment.
Figure 18:
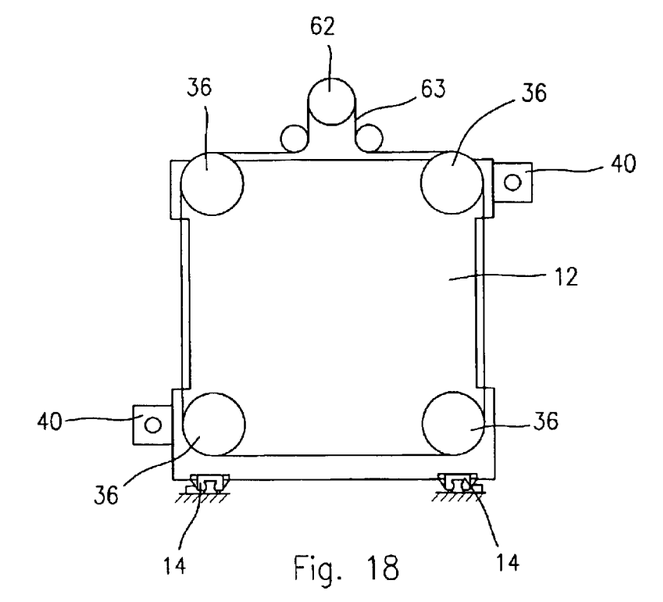
FIG. 18 shows a view from the right-hand of FIG. 17.

FIGS. 17 and 18 show a sixth solution which, like the previous solution, uses an electronic system for the synchronization and coordination between the movement of the movable platen 12 and the rotation of the clamping bushes on the rods 16.

This solution differs from that of FIGS. 15 and 16 in that control of the sliding of the platen is again achieved by means of two hydraulic cylinders 40; consequently the same reference numbers as the previous figures have again been used to indicate similar or equivalent parts.

Figure 19:
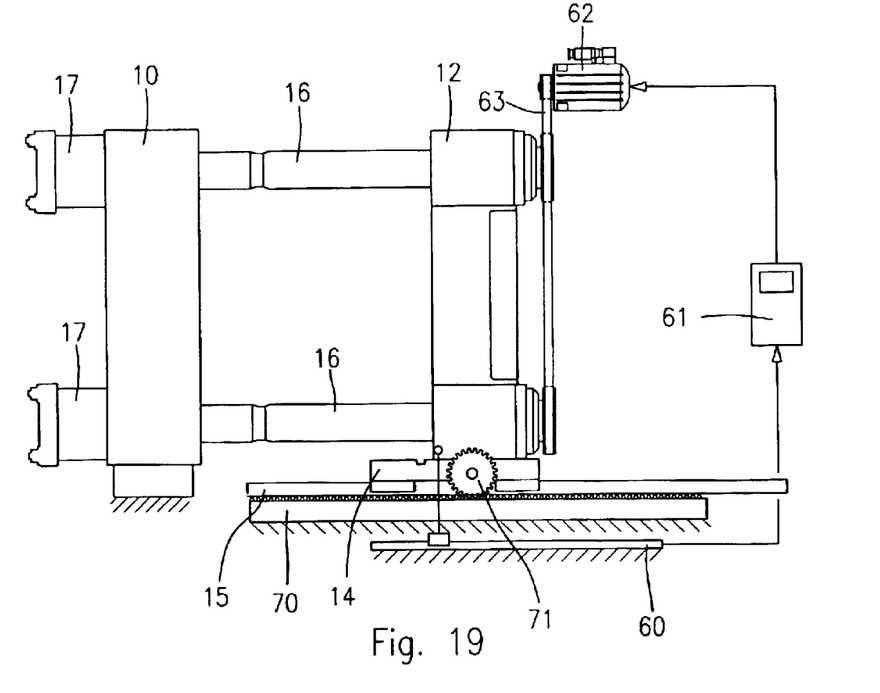
FIG. 19 shows a seventh embodiment.
Figure 20:
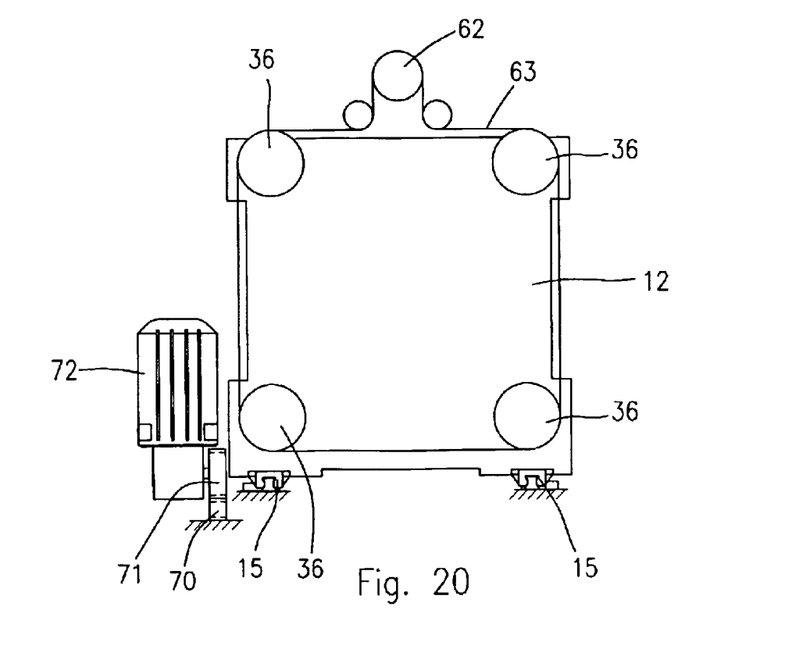
FIG. 20 shows a view from the right-hand of FIG. 19.

FIGS. 19 and 20 show a seventh solution which also makes use of an electronic synchronizing system and which, on the contrary, uses a rack-type control 70, 71 and an electric motor 72 for the displacement of the movable platen 12.

Figure 21:
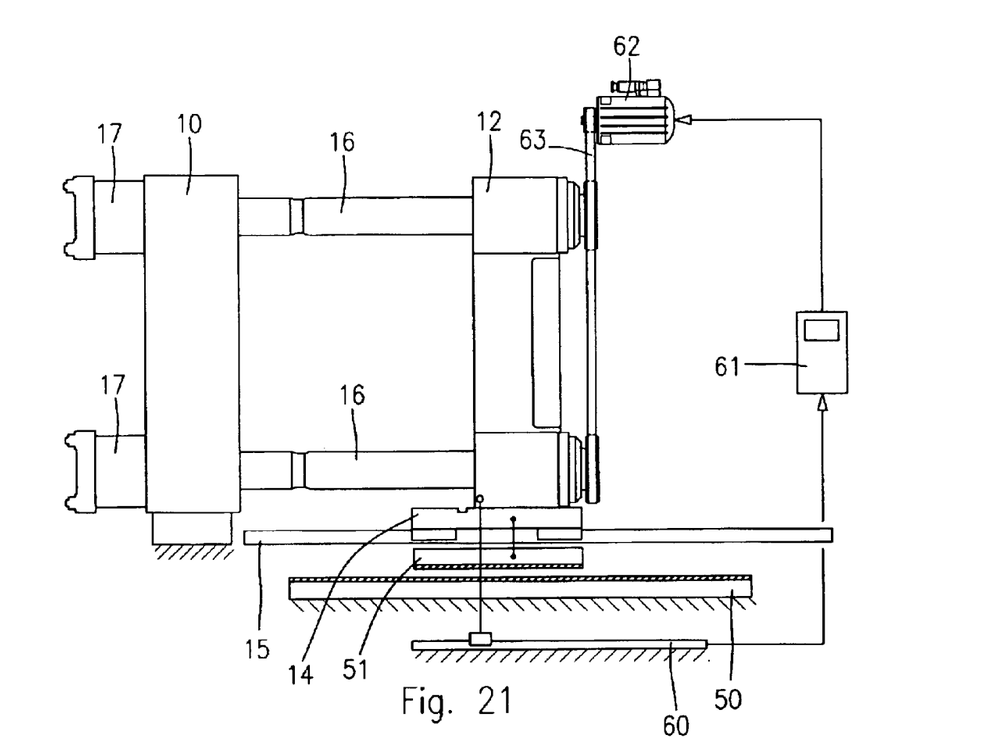
FIG. 21 shows an eighth embodiment.
Figure 22:
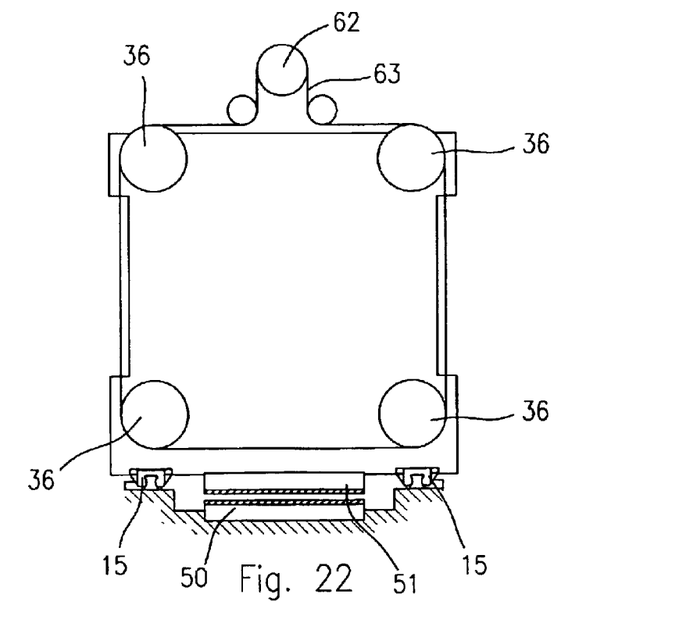
FIG. 22 shows a view from the right-hand of FIG. 21.

Lastly, FIGS. 21 and 22 show an eighth solution which also uses an electric or electronic synchronizing system, similar to that of the previous solutions, in which the movable platen 12 is now driven by a linear control motor 50, 51 similar to that of the solution of FIG. 14.

It is understood, however, that what has been described and shown in the various figures, has been given purely by way of example, and that other modifications or variations may be made, without departing from the scope of the claims.

What we claim is:

1. Method for clamping molds in an injection molding press of the type comprising:

a first platen for supporting a first half mold;

a second platen for supporting a second half mold, at least one of said platens being slidably movable with respect to the other one, parallel to a longitudinal axis of the press;

a plurality of peripheral tie-rods parallely extending to said longitudinal axis between the two mold supporting platens of the press;

first control means being provided for moving one platen towards and away from the other one, upon the closure and opening of the mold; and second control means for the tie-rods, and threaded bush members parallely arranged to the longitudinal axis of the press, said bush members having a threaded portion operatively connectable to a threaded portion of said tie-rods, to provide a high clamping force to tightly close the mold, the method comprising the steps of:

supporting the tie-rods axially sliding with respect to both the platens of the press;

providing a locking bush, for each tie-rod, rotatably and movably supported in the axial direction, by one of the platens of the press;

each locking bush and the corresponding tie-rod including opposite interengaging screw threaded portions having an axial clearance between them;

moving one of the platens in respect to the other one for closing and respectively for opening the mold by actuation of said first control means maintaining the screw threaded portions of the locking bushes and the tie-rods frictionless disengaged by synchronously rotating the locking bushes;

interengaging the screw threaded portion of the tie-rods with the screw threaded portion of the locking bushes by causing an axial sliding movement of the bushes by said second control means, to urge a shoulder member of the bushes against a corresponding shoulder surface of the platen of the press; and subsequently providing a clamping force to tightly close the mold, by generating a high axial force on the tie-rods and the locking bushes.

2. Method according to claim 1, wherein the step of synchronizing the rotation of the locking bushes, is provided by deriving their rotational movement from said first control means.

3. Method according to claim 2, wherein the step of synchronizing the rotational movement of the locking bushes, is performed by a mechanical drive directly connected to said first control means.

4. Method according to claim 2, wherein third independent control means are provided for causing the rotation of the locking bushes, and an electronic interlocking system between the movable platen and said third control means for synchronizing the rotational movement of the bushes and the sliding of the movable platen of the press.

5. A locking device for locking a tie-rod to a mold supporting platen of a press, comprising:

a displaceable tie-rod extending through the platen of the press, said tie-rod having an outer threaded portion thereon;

a locking bush rotatably supported by the platen, said locking bush having an inner threaded portion engageable and disengageable with the outer threaded portion of the tie-rod;

the threaded portions of the tie-rod and the locking bush being constructed and arranged to provide an axial clearance allowing a relative axial displacement between them;

an annular shoulder on the locking bush to be urged against a shoulder surface of the platen;

guide means rotatably engaging the locking bush to maintain the threaded portion of the same bush, disengaged from the threaded portion of the tie-rod, upon rotation of the bush and during displacement of the platen; and control means to provide an axial displacement between the threaded portions of tie-rod and the bush, and to urge said annular shoulder against said shoulder surface at the clamping of the mold.

6. Press for the injection molding of plastic materials, comprising:

a stationary platen for supporting a first half mold;

a movable platen for supporting a second half mold, said platen being slidingly movable along a longitudinal axis of the press;

a plurality of peripheral tie-rods parallelly extending between the platens of the press, each of said tie-rods having a threaded portion at one end;

first control means being provided to displace the movable platen towards and away from the stationary one; and second control means for the tie-rods and threaded bushes having threaded portions operatively engageable with threaded portions of the tie-rods to generate a clamping the force for tightly close the mold;

the tie-rods being movably supported in the axial direction by the platens of the press, through locking bushes rotatively supported by one of the platens of the press;

the threaded portions of each locking bush and the respective tie-rod having an axial clearance between them, to allow a relative axial movement of the tie-rod in respect to the locking bush;

each locking bush comprising an annular shoulder to engage a shoulder surface of a platen, by a short axial movement of the same bush; and means for providing a synchronized rotation of the locking bushes correlated to the sliding displacement of the movable platen of the press, and to maintain the threaded portion of the bush disengaged from the threaded portion of the corresponding tie-rod;

said second control means provided for selectively causing a first sliding movement of the tie-rods with respect to the locking bushes, along said axial clearance to bring the screw threaded portions into contact with each other, respectively a second sliding movement of the tie-rods and the locking bushes to bring the annular shoulders of the bushes into engagement with the shoulder surfaces of a platen, and to tightly clamp the two half molds.

7. Press according to claim 6, wherein the tie-rods and the second control means are supported by the stationary platen, while the locking bushes and the means for synchronizing the rotation of said locking bushes are supported by the movable platen of the press.

8. Press according to claim 6, wherein rotational guide means for the locking bushes constructed and arranged to maintain the screw threaded portion of each bush disengaged from the screw threaded portion of the corresponding tie-rod, during displacement of the movable platen of the press.

9. Press according to claim 8, wherein said guide means comprise an elastically yieldable pin fastened to the movable platen of the press, said pin having a guide roller running into an annular slot on the outside surface of the locking bush.

10. Press according to claim 8, wherein the first control means for controlling the movable platen comprise at least one actuator, and in that said means for synchronizing the rotation of the locking bushes are operatively connected to said actuator, or to said movable platen, by a movement transducer device.

11. Press according to claim 10, wherein the first control means for controlling the movable platen comprise at least one linear actuator, and in that the movement transducer device in turn comprises an operative mechanical connection between the linear actuator and the means for synchronizing the rotation of the locking bushes.

12. Press according to claim 10, wherein the first control means for controlling the movable platen comprise a linear actuator and in that the movement transducer device comprises a position sensing means for sensing the position of the movable platen, and an electronic transducer operatively connected to an electric motor for actuation of the means for synchronizing the rotation of the locking bushes.

13. Press according to claim 11 or 12, wherein the linear actuator comprises a screw and nut drive system, which extends between the two platens of the press.

14. Press according to claim 11 or 12, wherein the linear control actuator comprises at least one hydraulic cylinder which extends between the stationary platen and the movable platen of the press.

15. Press according to claim 11 or 12, wherein the linear actuator comprises at least one rack system which extends between the stationary platen and the movable platen of the press.

16. Press according to claim 11 or 12, wherein the linear actuator comprises at least one linear induction motor which is operatively connected to the movable platen of the press.

* * * * *